United States Patent
Ye et al.

(10) Patent No.: US 9,200,976 B2
(45) Date of Patent: Dec. 1, 2015

(54) SONAR METHOD AND APPARATUS FOR DETERMINING MATERIAL INTERFACES IN WHEEL SERVICING EQUIPMENT

(76) Inventors: Xin Ye, Antioch, TN (US); Matthew Weis, Murfreesboro, TN (US); Rhonda White, Smyrna, TN (US)

( * ) Notice: Subject to any disclaimer, the term of this patent is extended or adjusted under 35 U.S.C. 154(b) by 464 days.

(21) Appl. No.: 13/538,487

(22) Filed: Jun. 29, 2012

(65) Prior Publication Data
US 2013/0025372 A1    Jan. 31, 2013

Related U.S. Application Data

(60) Provisional application No. 61/503,408, filed on Jun. 30, 2011.

(51) Int. Cl.
G01M 1/02    (2006.01)
G01M 1/04    (2006.01)

(52) U.S. Cl.
CPC .................................. G01M 1/045 (2013.01)

(58) Field of Classification Search
CPC ...................................................... G01M 1/045
USPC .......................................... 73/462, 597, 487
See application file for complete search history.

(56) References Cited

U.S. PATENT DOCUMENTS

| | | | |
|---|---|---|---|
| 3,148,535 A | * | 9/1964 | Lemelson ........................ 73/600 |
| 4,089,225 A | | 5/1978 | Kraska et al. |
| 4,356,850 A | | 11/1982 | Halgrimson et al. |
| 4,372,366 A | | 2/1983 | Dugger |
| 4,423,632 A | | 1/1984 | Madden et al. |
| 5,189,912 A | | 3/1993 | Quinlan et al. |
| 5,377,542 A | | 1/1995 | McConnell et al. |
| 5,969,247 A | | 10/1999 | Carter et al. |
| 6,523,408 B1 | | 2/2003 | Colarelli, III et al. |
| 6,715,351 B1 | | 4/2004 | Feero et al. |
| 7,096,150 B2 | | 8/2006 | Shavers et al. |
| 7,191,650 B2 | | 3/2007 | Cunningham et al. |
| 7,355,687 B2 | | 4/2008 | Voeller et al. |
| 7,574,913 B2 | | 8/2009 | Gerdes et al. |
| 7,881,879 B2 | | 2/2011 | Douglas et al. |
| 7,882,738 B2 | | 2/2011 | Carpenter et al. |
| 7,882,739 B1 | | 2/2011 | Truex |
| 8,186,215 B2 | | 5/2012 | Douglas et al. |
| 2006/0254361 A1 | | 11/2006 | Douglas |

(Continued)

OTHER PUBLICATIONS

International Search Report dated Jan. 29, 2013, in corresponding International Application PCT/US2012/044965, 3 pp.

*Primary Examiner* — John Chapman, Jr.
(74) *Attorney, Agent, or Firm* — Patterson Intellectual Property Law P.C.; Mark J. Patterson

(57) ABSTRACT

A wheel servicing machine such as a wheel balancer includes an acoustic transducer configured to measure energy of one or more reflected acoustic waves after the waves have bounced off a material boundary surface such as a wheel assembly. In some embodiments, a return energy index signal representative of the measured energy is generated by a transducer and is further processed by a processor to control operations of the machine. The acoustic transducer also measures distance between the transducer and the wheel assembly surface in some embodiments. One or more values in a sample queue of acquired distance data may be flagged, or indexed, based on variation in the magnitude of the return energy signal. Methods of measuring wheel width using sonar measurement of both distance and reflected energy are also provided.

16 Claims, 13 Drawing Sheets

(56) References Cited

U.S. PATENT DOCUMENTS

| | | |
|---|---|---|
| 2007/0068259 A1 | 3/2007 | Douglas |
| 2008/0244919 A1 | 10/2008 | Douglas et al. |
| 2008/0282799 A1 | 11/2008 | Douglas et al. |
| 2009/0267784 A1 | 10/2009 | Braghiroli et al. |
| 2011/0208476 A1 | 8/2011 | Braghiroli |

* cited by examiner

SONAR METHOD AND APPARATUS FOR DETERMINING MATERIAL INTERFACES IN WHEEL SERVICING EQUIPMENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the U.S. Patent Application Ser. No. 61/503,408 entitled Sonar Method And Apparatus For Determining Material Interfaces In Wheel Servicing Equipment, filed Jun. 30, 2011.

BACKGROUND

The present invention relates generally to wheel servicing machines such as wheel balancers and tire changing machines. More particularly, the present invention relates to devices and methods for identifying material interfaces on or near a tire using active sonar.

Balancing machines are well-known in the art for measuring rotodynamic imbalance in a rotating body, such as a vehicle wheel. Wheel balancing machines, or wheel balancers, typically include a rotatable shaft directly or indirectly coupled to a motor or drive mechanism. A vehicle wheel can be releasably mounted on the shaft and rotated. Various forces associated with static or dynamic imbalance properties of the wheel are measured using one or more force transducers linked to the shaft. The measured imbalance forces can be correlated with the wheel dimensions in a computer-based algorithm to determine the locations of any asymmetric mass distribution present in the wheel. Such unequal mass distribution will cause the wheel to be "unbalanced." Based on the measured forces, corrective weights may then be applied to the rim to balance the wheel.

Three primary wheel assembly dimensions are needed to determine where the corrective wheel weights should be positioned. These dimensions generally include the "A" distance between the wheel rim and the right force transducer, the "D" distance corresponding to the diameter of the wheel rim, and the "W" distance corresponding to the axial width of the wheel rim. Using these three dimensions together with the imbalance forces measured by the force transducers during a test spin of the wheel, a pre-determined wheel balancing algorithm can calculate and identify to an operator the optimal locations for application of corrective weights to balance the wheel.

Conventional wheel balancing machines can include one or more devices for manually or automatically determining the A and D dimensions of the wheel assembly. For example, U.S. Pat. No. 7,882,739 teaches a wheel balancer including a data acquisition arm, or A&D arm, for measuring the A and D dimensions. However, the width dimension W is more difficult to measure because of fluctuations in the local width of the wheel assembly. For example, many styles of modern tires include variations in local width corresponding to different radial and/or angular locations along the outer surfaces of the tire. It is important that the W dimension used in the balancing algorithm be the W dimension corresponding to the width of the wheel rim at the outermost radial wheel rim location. The W dimension should not correspond to a local width on the tire. When an improper width dimension W is used in the balancing algorithm, an improper corrective weight location may be calculated, and the wheel will not be properly balanced.

During a conventional wheel balancing procedure, a machine operator may manually measure the width dimension W using a pair of calipers. However, such conventional methods of width determination are often time-consuming and may lead to error or miscalculation. To overcome this problem, others have developed improved methods and devices for automatically determining the width dimension W. For example, U.S. Pat. No. 5,189,912 teaches an ultrasonic wheel measuring apparatus and wheel balancer that uses an acoustic, or sonar, signal to measure the distance between a reference plane and the local wheel assembly surface. That measured distance can be used to calculate width measurement W. Such conventional acoustic devices for measuring wheel assembly width rely on local differences in distance between the acoustic transducer and the wheel assembly surface to calculate wheel assembly width. As the sonar signal articulates past the wheel profile, the time of flight of the composite incident and reflected acoustic wave is used to determine a local distance between the wheel assembly surface and the transducer. A queue of distance samples is then compiled, with each sample corresponding to a different radial location on the wheel assembly surface. A processor then attempts to identify the tire/rim transition location based on a change or pattern in the measured distance sample queue. The measured distance sample corresponding to that radial position is then used to calculate the width dimension W.

Conventional sonar distance measurement devices for determining width dimension W on a wheel balancing machine based solely on an acoustic wave time of flight calculations can generate erroneous determinations of tire/rim interface location in many applications. For example, modern tires having a contoured or textured outer side wall may cause variations in sonar time of flight signature that are similar to the predetermined signature identified for a tire/rim interface, but correspond only to changes in the structure of the tire. When a corresponding balancing operation is performed based on the erroneous width measurement W, the operator may be instructed to apply weights at improper locations, resulting in a wheel that is improperly balanced.

What is needed, then, are improvements in the devices and methods for determining wheel assembly dimensions using acoustic signal processing.

BRIEF SUMMARY

The present invention provides devices and methods for determining wheel assembly dimensions for use in wheel servicing operations. The dimensional information can be used to perform calculations for manipulation of wheel servicing equipment, such as wheel balancing machines and tire changing machines.

The present invention also provides devices and methods for determining material interfaces using a measurement of acoustic wave reflective energy. Because different materials have different acoustic wave reflection energy signatures, the location of a material interface such as an interface between a rubber tire and a metal wheel rim can be determined by measuring the energy of reflected acoustic waves at different locations on a surface. Identification of the material interface location allows an operator to properly determine other dimensional information, such as width dimension W. Material interface identification may also be used to control or stop control of mechanical system components, such as motors or actuators, for automation or safety considerations.

In some embodiments, the present invention provides a wheel balancer apparatus including a base and a rotatable shaft extending away from the base. An acoustic transducer is mounted at a location relative to the shaft, and the acoustic transducer is configured to measure reflected acoustic wave energy.

In further embodiments, the present invention provides a method of balancing a wheel assembly. The method includes the steps of: (a) providing a wheel balancing machine including a rotatable shaft and an acoustic transducer positioned at a location relative to the shaft; (b) positioning a wheel assembly having a tire mounted on a rim onto the shaft; (c) acquiring distance data associated with the distance between the acoustic transducer and the wheel assembly at a plurality of sample acquisition locations; and (d) acquiring energy data associated with reflected acoustic wave energy at each sample acquisition location.

Additional embodiments of the present invention provide a method of determining a wheel width dimension of a wheel assembly. The method includes the steps of (a) emitting acoustic waves toward the wheel assembly using an acoustic transducer; (b) detecting acoustic waves reflected from the wheel assembly back toward the acoustic transducer; (c) generating a plurality of distance values associated with the reflected acoustic waves; (d) measuring the reflective energy of the reflected acoustic waves; and (e) generating a plurality of reflective energy values associated with the reflected acoustic waves.

Numerous other objects, advantages and features of the present invention will be readily apparent to those of skill in the art upon a review of the following drawings and description of a preferred embodiment.

DETAILED DESCRIPTION

Figure 1:
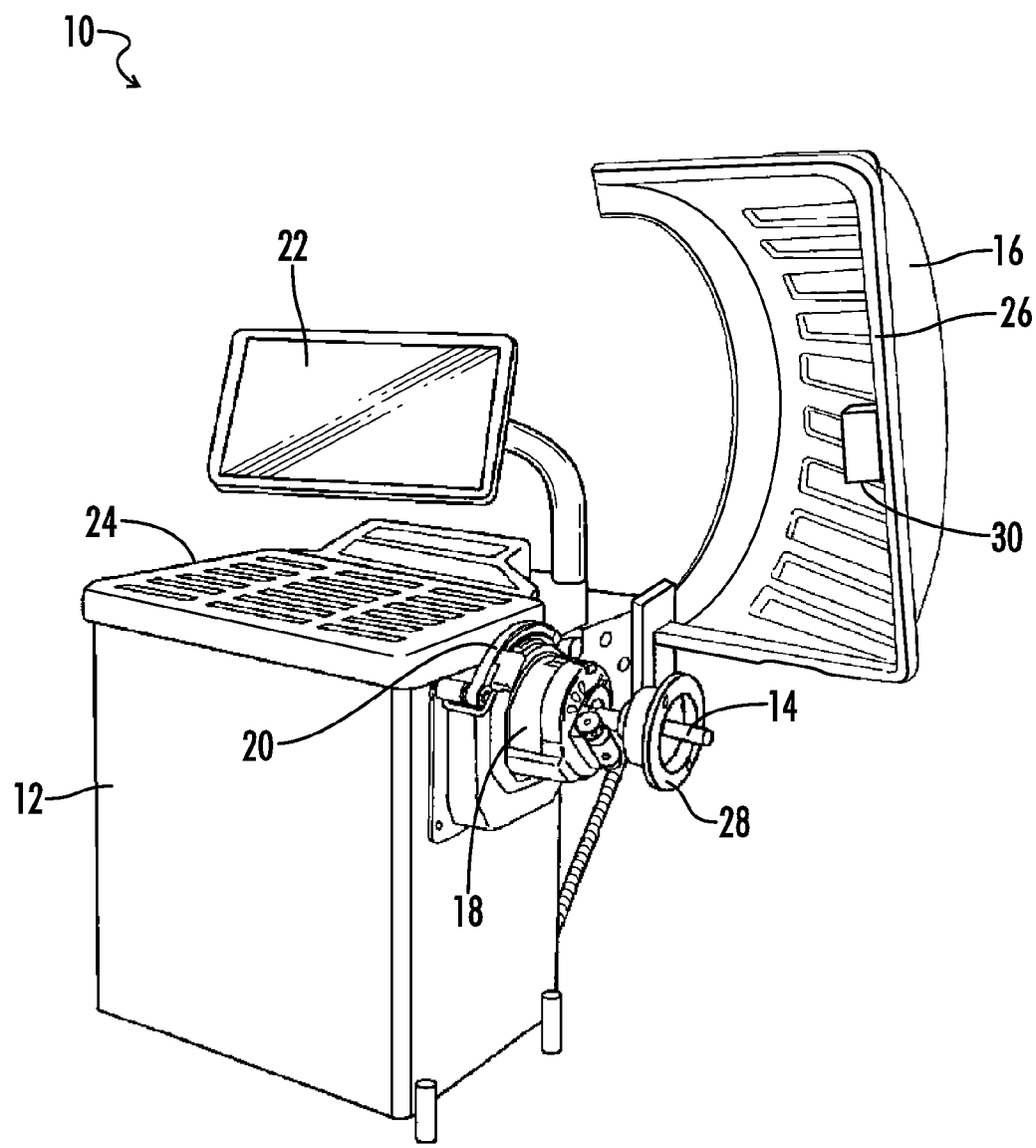
FIG. 1 illustrates a perspective view of an embodiment of an electronic wheel balancing machine showing an acoustic transducer module in accordance with the present invention.

Referring now to the drawings, various embodiments of the invention are illustrated. A wheel servicing machine 10 is illustrated in FIG. 1. Wheel servicing machine 10 may be a wheel balancer in some embodiments. Wheel servicing machine 10 includes a base 12, or chassis, and a rotatable shaft 14 extending from base 12. A support ring 28 may also support a wheel when mounted on shaft 14. An operator panel 22 is connected to base 12. The operator panel 22 may include a control/input device for allowing a user to control operations of the machine 10. In some embodiments, the operator panel 22 may be a computer-based control interface, such as touch-screen monitor. In other embodiments, operator panel 22 may be an analog control station including one or more analog controls. The operator panel 22 may be direct-wired to base 12 or wirelessly coupled to base 12 in additional embodiments. Also, a motor and motor driver 18 are coupled to shaft 14, and an encoder 62 may be linked to motor and driver 18, or alternatively to shaft 14, to provide feedback data associated with movement of shaft 14.

Figure 2:
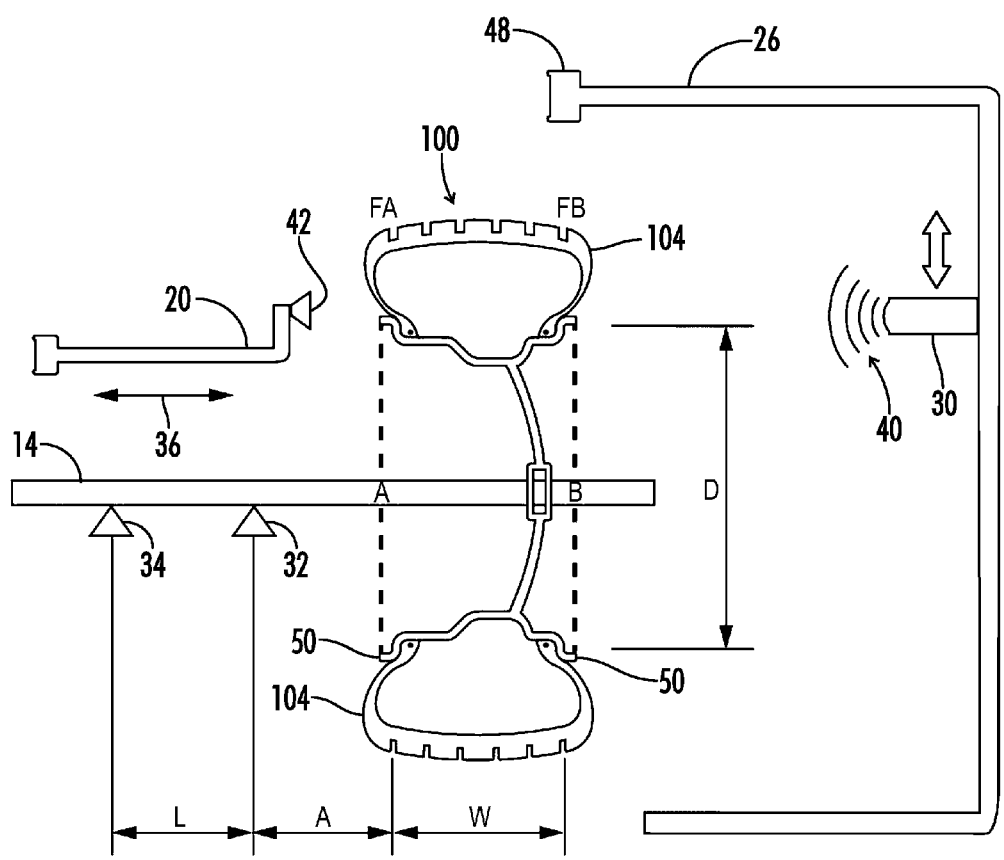
FIG. 2 illustrates a schematic view of an embodiment of a wheel servicing machine including an acoustic transducer module in accordance with the present invention.

A hood 16 is pivotally attached to base 12 in some embodiments such that hood 16 may be angularly rotated toward shaft 14. When a wheel assembly 100 is mounted on shaft 14, as seen in FIG. 2, hood 16 may cover wheel assembly 100 during rotation of shaft 14 to provide a safety device. In some embodiments, the machine 10 is configured with a safety interlock such that shaft 14 may not rotate unless hood 16 is lowered over wheel assembly 100.

A hood switch 48, or hood sensor, is coupled to the hood. The hood switch 48 may be any type of suitable switch known in the art, including a linear or angular mechanical switch or a contact sensor. The hood switch 48 can be used to determine whether the hood is in the retracted position away from the shaft 14 or in the engaged position positioned nearer the shaft 14. The switch 48 is also one of safety inter-locked devices in the wheel servicing machine 10.

A hood bar 26 may form a supporting frame for hood 16 in some embodiments. Hood bar 26 may be pivotally attached to base 12, and hood 16 may be attached to hood bar 26 in some embodiments.

A tray 24 is mounted on base 12 in some embodiments. Tray 24 includes a plurality of compartments for storing various styles and sizes of wheel weights.

As seen in FIG. 2, an A&D measurement arm 20 extends from base 12 in the same axial direction as shaft 14. A&D arm 20 may be axially moveable along axis 36 toward wheel assembly 100 and also angularly moveable for measuring the A dimension and the D dimension of wheel assembly 100. In some embodiments, a head 42 having a non-metal material composition can be disposed on the distal end of A&D arm 20 to prevent damage to wheel rim 102 on wheel assembly 100. During use, an operator can measure the A and D dimensions using A&D arm 20, or using any other suitable measurement technique, and then enter the dimensions into a processor and/or data storage unit associated with machine 10 using operator panel 22. Alternatively, the A and D dimensions may be automatically acquired and transmitted to a processor/data storage unit in machine 10.

As seen in FIG. 2, the width dimension W must be determined and entered into the device prior to application of corrective wheel weights. Width dimension W generally corresponds to the width of the wheel rim 102 at its outermost perimeter. Width dimension W in some embodiments may also be referred to as the rim width or the wheel rim width. Generally, width dimension W, as seen in FIG. 2, does not include the axial width of the outermost rim flanges 50 that protrude axially from each side of wheel rim 102, but rather corresponds to the inner width of the outer region of the wheel rim 102 where the tire bead sits.

Referring further to FIG. 2, in some embodiments, an acoustic transducer module 30 is mounted at a location relative to the shaft 14. In some embodiments, acoustic transducer module 30 may be interchangeably referred to as a sonar module 30. Sonar module 30 includes a transducer or a transceiver capable of converting electrical input into acoustic energy for generating acoustic waves. The sonar module 30 also includes a transducer or transceiver capable of converting return acoustic energy in the form of incoming acoustic waves into certain electronic signal strength. In some embodiments, sonar module 30 includes separate transducers or transceivers for emitting acoustic waves and for measuring incoming acoustic waves. In other embodiments, sonar module 30 includes a single transducer or transceiver capable of both emitting acoustic waves and also measuring incoming acoustic waves.

Figure 3:
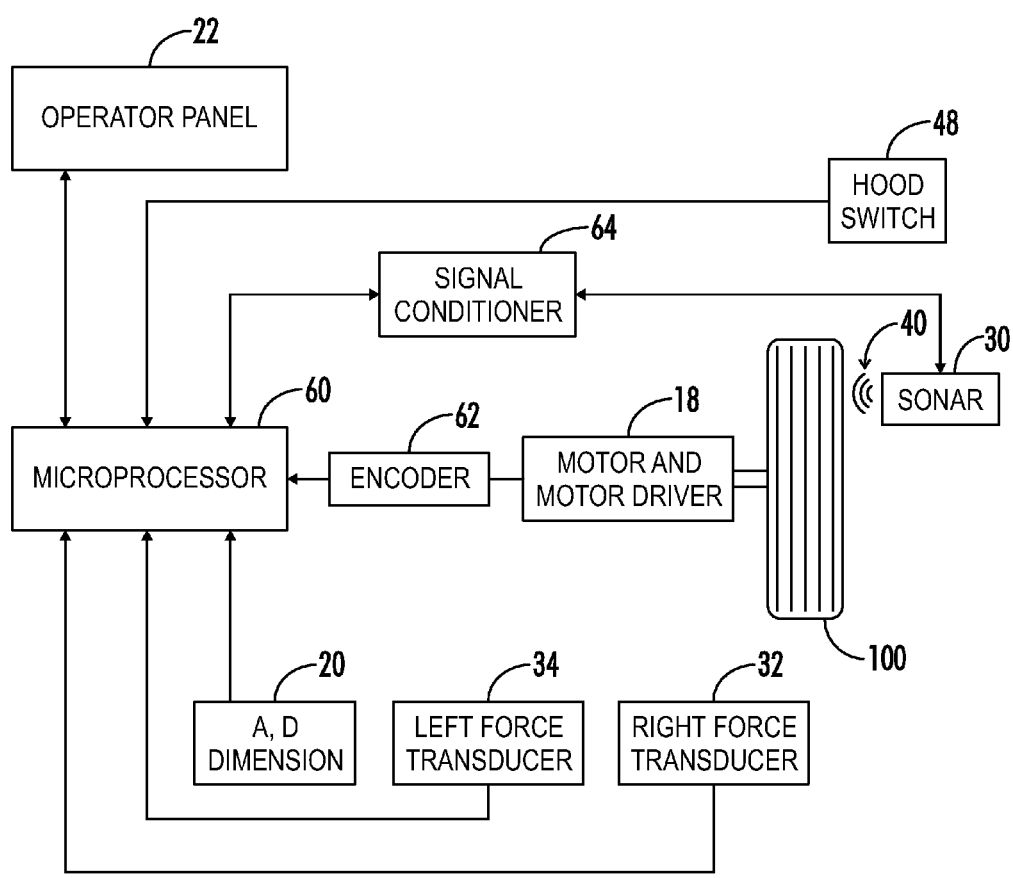
FIG. 3 illustrates a block diagram showing an embodiment of a wheel servicing machine including an acoustic transducer module in accordance with the present invention.

Sonar module 30 is generally configured to emit an acoustic beam 40, or sonar beam 40, including acoustic waves in a desired frequency range and radiation angles. For example, in some embodiments, sonar module 30 includes an ultrasonic transducer generally configured to provide an output acoustic wave beam in an ultrasonic frequency range. The emitted acoustic beam 40 may be focused in some applications. As seen in FIG. 2 and FIG. 3, sonar module 30 is generally positioned such that the outgoing acoustic beam 40 is directed toward a wheel assembly 100 mounted on shaft 14.

Figure 4:
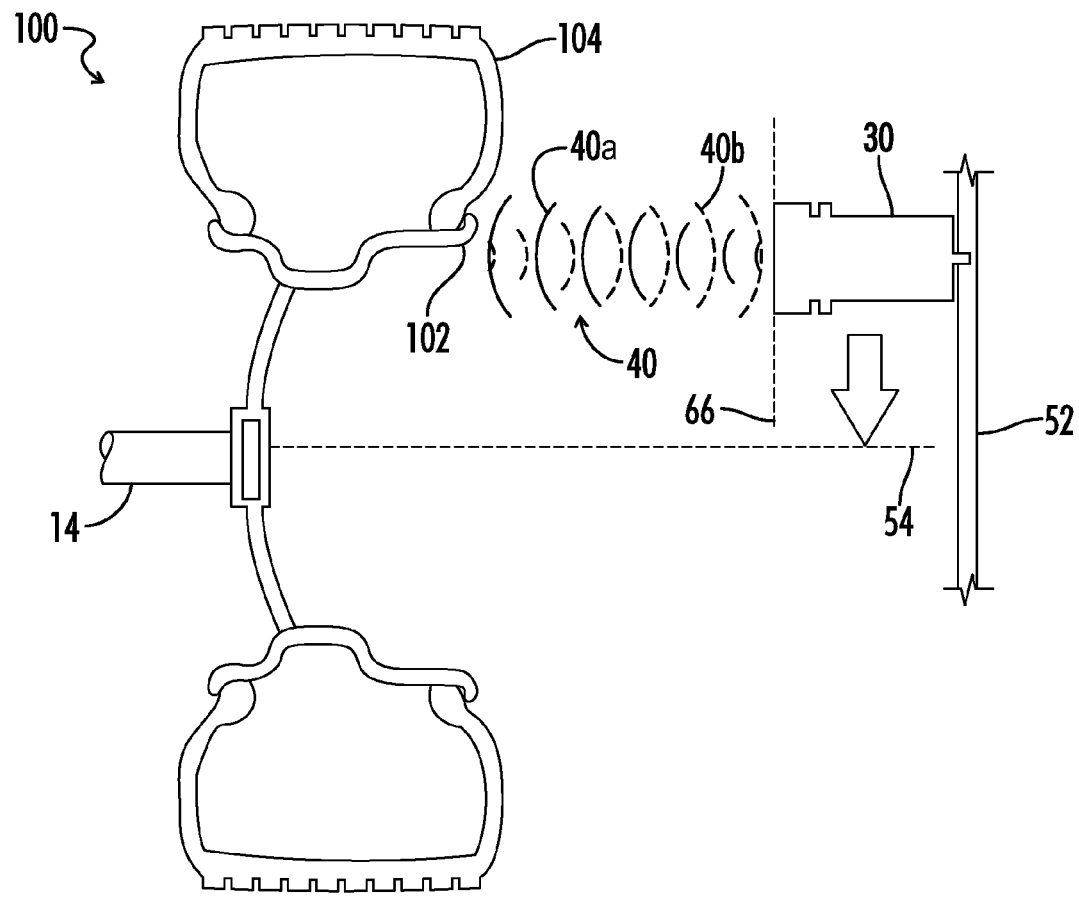
FIG. 4 illustrates a partial cross-sectional view of an embodiment of a wheel assembly and an acoustic transducer module positioned to measure both distance to the wheel assembly and energy of a reflected acoustic wave.
Figure 5:
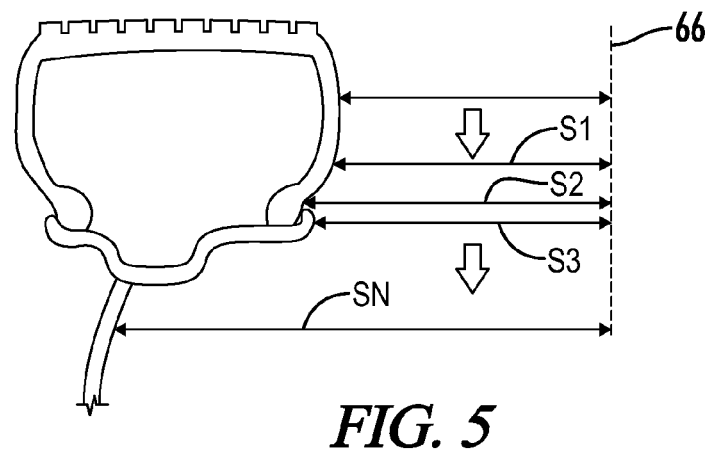
FIG. 5 illustrates a partial cross-sectional view of an embodiment of a wheel assembly showing a plurality of sample acquisition locations.

Because sonar module 30 emits a directional acoustic beam 40, it may be necessary to provide means for translating, or scanning, beam 40 across the surface of wheel assembly 100 to determine the desired surface profile characteristics at various radial positions. In some embodiments, sonar module 30 may be mounted on a translation stage 52 operable to move sonar module 30 from a location near the outer perimeter of wheel assembly 100 radially inwardly toward shaft 14, or toward shaft axis of rotation 54, as seen in FIG. 4. As sonar module 30 is advanced toward shaft 14, periodic signal samples can be taken at different radial positions. For example, as seen in FIG. 5, a first sample $S_1$ can be taken at a first radial position; a second sample $S_2$ can be taken at a second radial position near the location of first sample $S_1$; a third sample $S_3$ can be taken at a third radial position near the location of second sample $S_2$, all the way up to a predetermined number of samples $S_N$. The collective samples can be compiled and stored in a sample queue in the machine processor/data storage unit including an array of data values corresponding to information associated with each sample. The sonar module 30, or its associated processor 60, can be routinely programmed to determine a sample rate in some embodiments. Additionally, the rate of advance of sonar module 30 along translation stage 52 can also influence sampling rate and sampling locations.

In some embodiments, sonar module 30 is mounted on the hood 16 or hood bar 26, as seen in FIG. 1. When the operator lowers the hood to the operating position, the hood switch 48 will trigger the sonar data sampling process controlled by a microprocessor 60. In some embodiments, the microprocessor 60 can be dedicated to implementing and controlling the functionality of the sonar module 30, and processing data received from sonar module 30, as described herein. In other embodiments, microprocessor 60 can also be used to control other functions of the machine 10, including for example processing force imbalance measurement data and determining wheel weight mass and placement information.

In alternative embodiments, sonar module 30 is configured to be angularly rotated rather than translated to allow acoustic beam 40 to scan the surface of wheel assembly 100.

Each sample $S_1, S_2, S_3 \ldots S_N$ includes information associated with the time period between initiation of the outgoing acoustic wave and the measured reflected wave. This time difference may be referred to as the time of flight. The emitted acoustic wave 40a, seen in FIG. 4, is generated by a finite-width electrical pulse input signal TX sent to the transducer or transceiver by microprocessor 60, as seen in FIG. 3. The pulse input signal TX may be sent to the sonar module 30 as an analog voltage signal in some embodiments.

Figure 6:
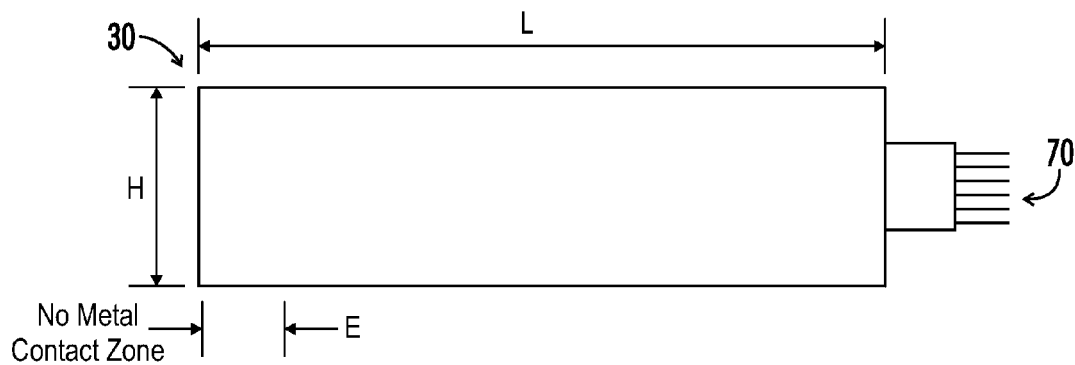
FIG. 6 illustrates an embodiment of a sonar module in accordance with the present invention.
Figure 7:
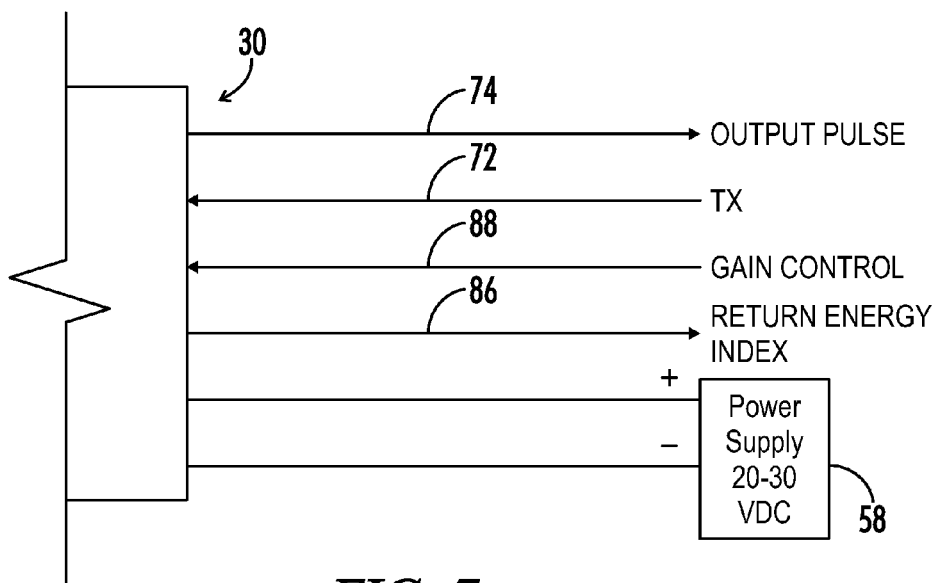
FIG. 7 illustrates a detail view of the module terminal connectors on the embodiment of a sonar module of FIG. 6.

Referring to FIG. 6 and FIG. 7, an embodiment of a sonar module 30 includes a plurality of electrical terminals 70 for connecting sonar module 30 to a power source and to data acquisition and processing circuitry. Sonar module 30 may be an ultrasonic transducer in some embodiments, such as but not limited to model RPS-409PW-40 sonar device manufactured by Migatron Corp. of Woodstock, Ill. In some embodiments, the terminals 70 on sonar module 30 are coupled to a microprocessor 60 and to a power supply 58. Sonar module 30 in some embodiments includes at least two input terminals and two output terminals. The pulse input signal TX terminal 72 receives the incoming pulse input signal TX from microprocessor 60. In some embodiments, as shown in FIG. 3, the signals communicated between the sonar module 30 and microprocessor 60 are coupled through a signal conditioning circuit 64 which can provide signal level shifting, filtering, A/D and D/A conversion as needed. Signal conditioning circuit 64 can also include automatic gain control, voltage threshold detection, and peak detection circuitry as described below.

Figure 8:
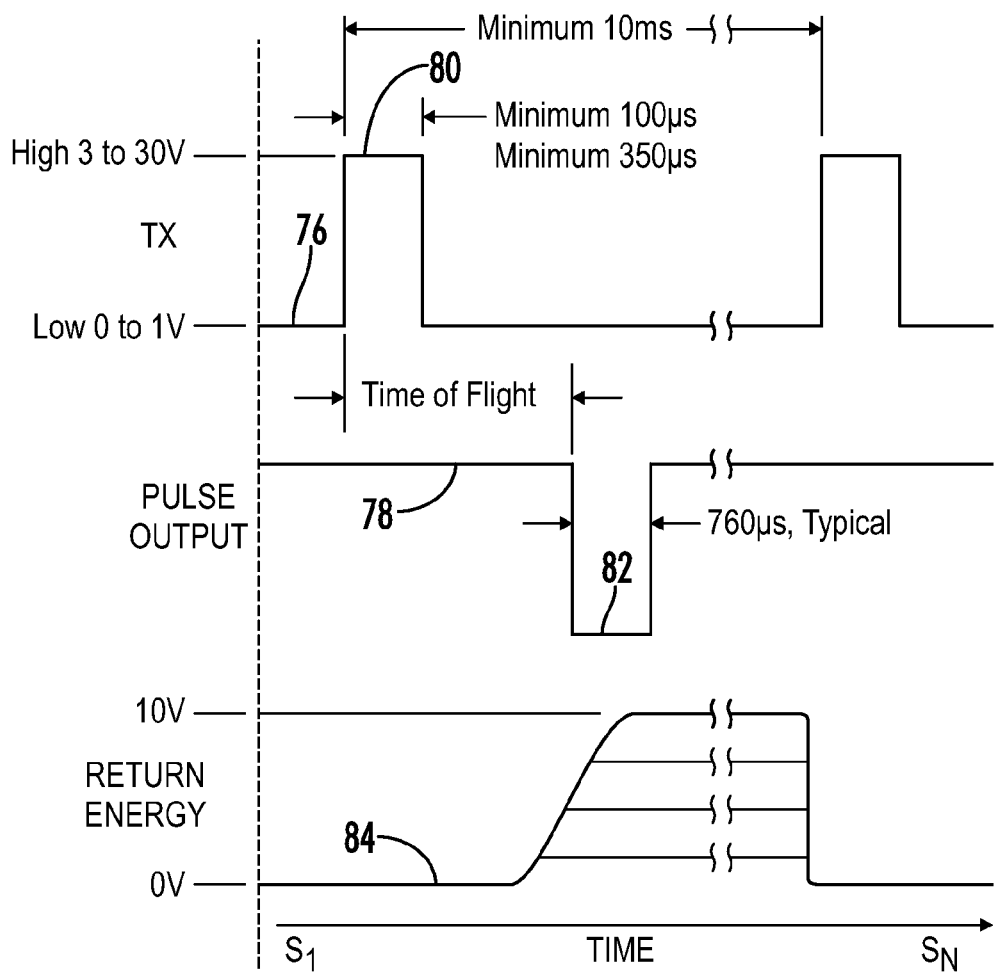
FIG. 8 illustrates a graph of input TX signal, pulse output signal and reflected energy signal as a function of time for some embodiments of the present invention.

As seen in FIG. 8, pulse input signal TX 76 may have a pulse width of input pulse 80 between about 100 μs and about 350 μs and a peak input voltage between about 3V and about 30V in some embodiments. The time between pulses is a minimum of about 10 ms in some embodiments. A baseline activation voltage of between about 0V and about 1V is maintained on the acoustic transducer between adjacent applied electrical pulses 80.

Figure 9:
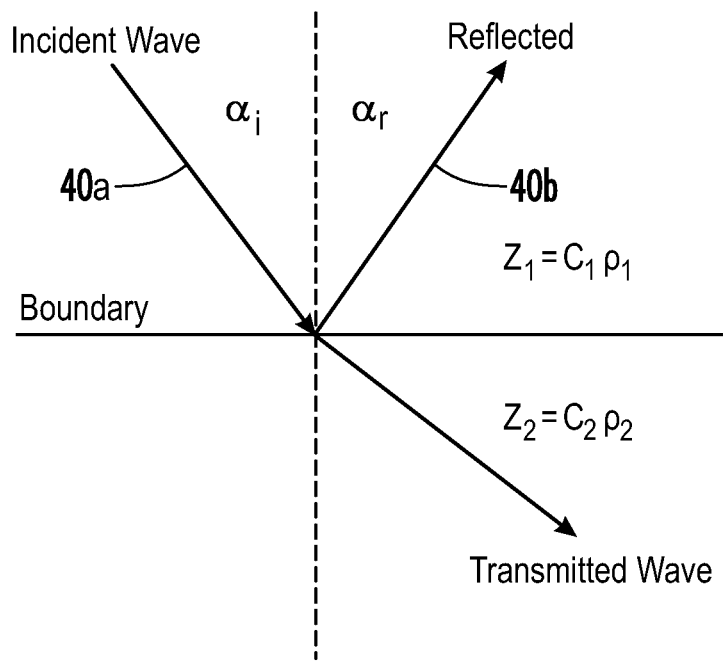
FIG. 9 illustrates an example of an incident acoustic wave being reflected from a material boundary.

When electrical pulse 80 is applied to the acoustic transducer, or sonar transducer, in sonar module 30, an outgoing acoustic wave 40a is emitted from sonar module 30 toward wheel assembly 100. In general, the sonar wave follows acoustic principles. As seen in FIG. 9, an incident, or emitted, acoustic wave 40a travels toward a boundary such as the surface of wheel assembly 100 and a portion of the incident wave is reflected. The reflected wave portion 40b travels back toward the sonar module 30, as seen in FIG. 4.

The angle of incidence is generally equal to the angle of reflection. When the acoustic wave is normal to the boundary, the refection can be described in terms of the reflection coefficient R. The reflection coefficient is defined as the ratio of the reflected and incident wave amplitudes $$R = \frac{\alpha r}{\alpha i}$$

where αi and αr are the incident and reflected wave amplitudes, respectively. The transmitted wave is 1−R.

The value of the acoustic reflection coefficient R relates to the magnitude of reflection from the interface between two media with different physical properties. The acoustic impedance Z mainly determines the magnitude of reflection from a boundary. The acoustic impedance Z is defined as the product of the density (ρ) and the acoustic speed (c) in a given medium. The acoustic impedance is measured in Rayles unit (Rayl) wherein one Rayl=1 kg/m²/sec.

The acoustic reflection coefficient for a non-perpendicular angle of incidence can be expressed as:

$$R = \frac{\left[\left(\frac{Z2}{Z1}\right) - \sqrt{(1-(n-1)\times\tan^2(\alpha i))}\right]}{\left[\left(\frac{Z2}{Z1}\right) + \sqrt{(1-(n-1)+\tan^2(\alpha i))}\right]}$$

where $$n = \left(\frac{c2}{c1}\right)^2$$

and αi is the angle of approach, or incidence angle, of the incident wave 40a. The constant values c1 and c2 are the speed of the acoustic wave in the two media, respectively.

With an acoustic beam normal incidence on the boundary of its media, the reflection equation can be reduced to:

$$R = \frac{(Z2-Z1)}{(Z2+Z1)}$$

Therefore, the acoustic reflection coefficient R for a normal incident angle is a simple function of the acoustic impedance of the two media. The acoustic reflection coefficient will be strong where there are strong spatial gradients in acoustic impedance. Typically, the acoustic impedance of the metal material in wheel rim 102 is more than twenty times greater than the acoustic impedance of the rubber material of tire 104.

Based on this difference, it is possible use a measurement of reflected acoustic wave energy to determine a boundary between dissimilar materials.

Referring again to FIG. 4, reflected wave portion 40b for each sample acquisition provides at least two pieces of information corresponding to that sample location. First, the reflected acoustic wave 40b interacts with a transducer or transceiver in sonar module 30 and creates an electrical return pulse 82 corresponding to the duration of the reflected wave. Second, the reflected wave 40b includes a reflected acoustic wave energy that can be measured and, based on variation in acoustic impedance of dissimilar materials, can be used to identify the location of an interface between dissimilar materials such as a metal wheel rim and a rubber tire.

Return pulse 82 can be measured as part of pulse output signal 78, as seen in FIG. 8. Return pulse 82 has a finite pulse width corresponding to the duration of the reflected acoustic wave. In some embodiments, the duration of return pulse 82 is around 760 μs. However, the width of return pulse 82 will generally correspond to the duration of input pulse 80, and may vary substantially in alternative embodiments. Return pulse 82 is temporally offset from the input pulse 80 because it takes time for the acoustic wave to travel to the wheel assembly surface and be reflected back to the sonar module 30. This time value, or time of flight, can be determined by calculating the difference between the beginning of the input pulse 80 and the beginning of the return pulse 82. Once the time of flight is known, the distance between the sonar module 30 and the reflective surface can be calculated. Specifically, the distance between the transducer surface translation plane 66 and the object being detected can be calculated in some embodiments.

A pulse output signal terminal 74, seen in FIG. 7, is used to transmit the measured electronic pulse output signal 78 to microprocessor 60. In some embodiments, the pulse output signal at terminal 74 can be provided as open collector output signal from a NPN transistor operable at a maximum voltage of 30V and a continuous current of 10 mA.

Microprocessor 60 in some embodiments may be any suitable microprocessor, such as but not limited to model TMX320C28xx DSP microprocessor manufactured by Texas Instruments, Inc. of Dallas, Tex. Microprocessor 60 in some embodiments is included in a digital signal controller such as the TMS320F2811 32-bit digital signal controller with flash memory manufactured by Texas Instruments, Inc. This controller may include an Event Manager Unit. The pulse output signal 78 may be detected by one of the capture unit inputs in the Event Manager Unit of microprocessor 60.

As noted above, a second piece of information related to reflection energy can be obtained from the reflected acoustic wave 40b. A return energy signal 84, also referred to as a return energy index signal or reflective energy index signal, seen in FIG. 8, is output from sonar module 30 simultaneously with the pulse output signal 78. Return energy signal 84 is also time-aligned with pulse output signal 78, allowing a correlation between a peak in the measured return energy signal 84 and the width measurement at a given radial position. Thus, in some embodiments the devices and methods of the present invention measure and store information associated with both time of flight and reflected acoustic wave energy for each sample location in the sample queue. The stored information associated with reflected energy may be used as an index to flag sample time of flight (and corresponding width W) data acquired at a material interface such as the interface between a metal rim and a rubber tire.

Return energy signal 84 typically is an analog voltage output signal directly related to the magnitude of reflective acoustic wave energy received by the acoustic transducer or transceiver in sonar module 30. A reflected energy signal output terminal 86 on sonar module 30 is coupled to microprocessor 60. The return energy signal 84 is processed by microprocessor 60 through a capture input channel on microprocessor 60. In some embodiments, return energy signal 84 is captured and processed by microprocessor 60 simultaneously with pulse output signal 78.

Figure 10:
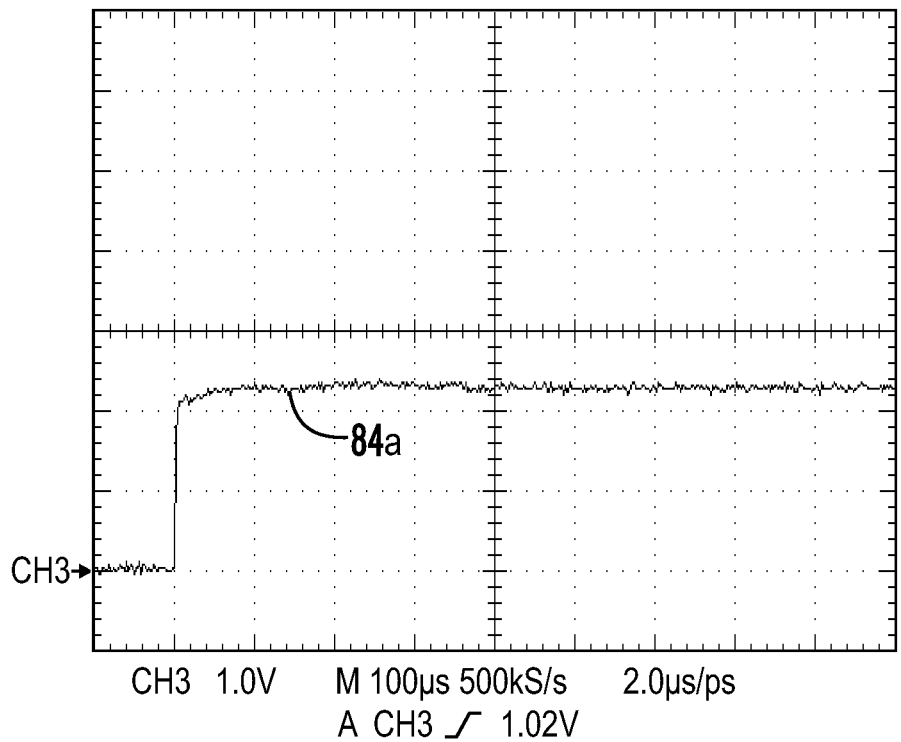
FIG. 10 illustrates an example oscilloscope display of a return energy signal as a function of time for a rubber material.

The return energy signal 84 is characteristic of the acoustic impedance of the material upon which acoustic beam 40 is incident. Different materials have different acoustic impedances, and thus will provide different return energy signal profiles. FIG. 10 illustrates an exemplary return energy signal 84a corresponding to a rubber tire captured as an experimental signal profile using a TDS5054B oscilloscope manufactured by Tektronix, Inc. The sample acquisition location for the return energy signal 84a was taken at a radial location on the rubber tire close to the metal rim. Based on such experimental signal profiles, it has been determined that the return energy signal peak voltage for a rubber tire close to the metal rim of a wheel is larger than about 2.0V and less than about 2.5V in some embodiments.

Figure 11:
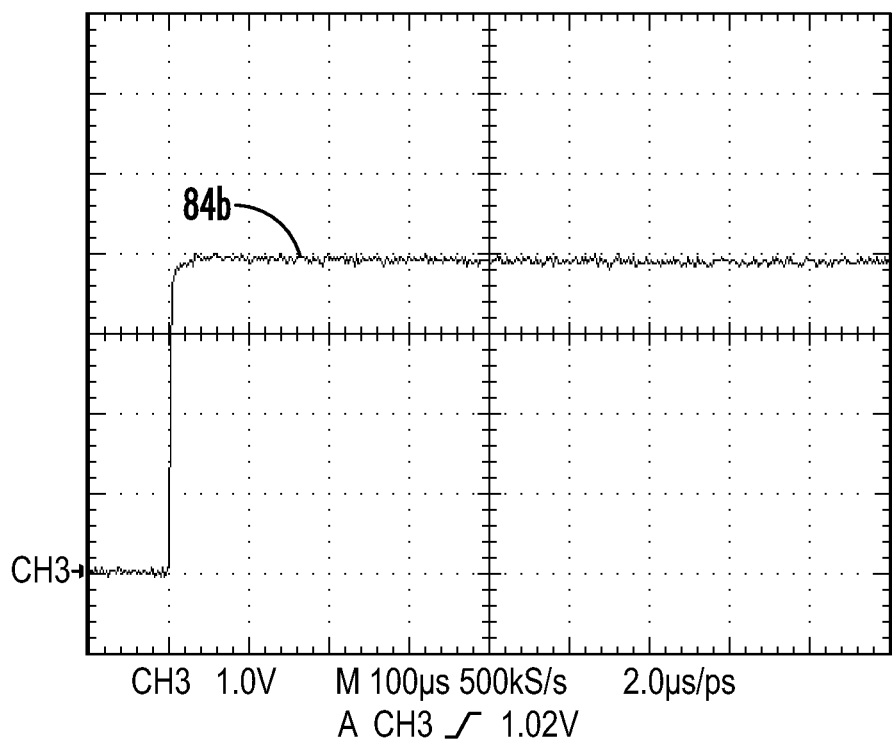
FIG. 11 illustrates an example oscilloscope display of a return energy signal as a function of time for a metal material.

Referring to FIG. 11, an exemplary return energy signal 84b corresponding to a metal wheel rim is illustrated. The return energy signal 84b was captured as an experimental signal profile using the same oscilloscope identified above. Return energy signal 84b for a metal wheel rim includes a peak voltage higher than the peak voltage of a similar return energy signal 84a corresponding to a rubber tire. It has been determined, that in some embodiments, a metal wheel rim provides a return energy signal having a peak voltage greater than about 3.5V. Based on this difference in peak voltage of return energy signals during subsequent sample acquisitions, it may be possible to identify a material boundary.

Return energy signal 84 is amplified by an automatic gain control (AGC) circuit disposed either in microprocessor 60, at an intermediate location between microprocessor circuit 60 and sonar module 30 (e.g., part of signal conditioning circuit 64, or in sonar module 30) in some embodiments. A gain control terminal 88 is included on sonar module 30 for receiving the gain control signal. In some embodiments, the gain control signal is an analog voltage signal between about 0V and about 10V.

Figure 12:
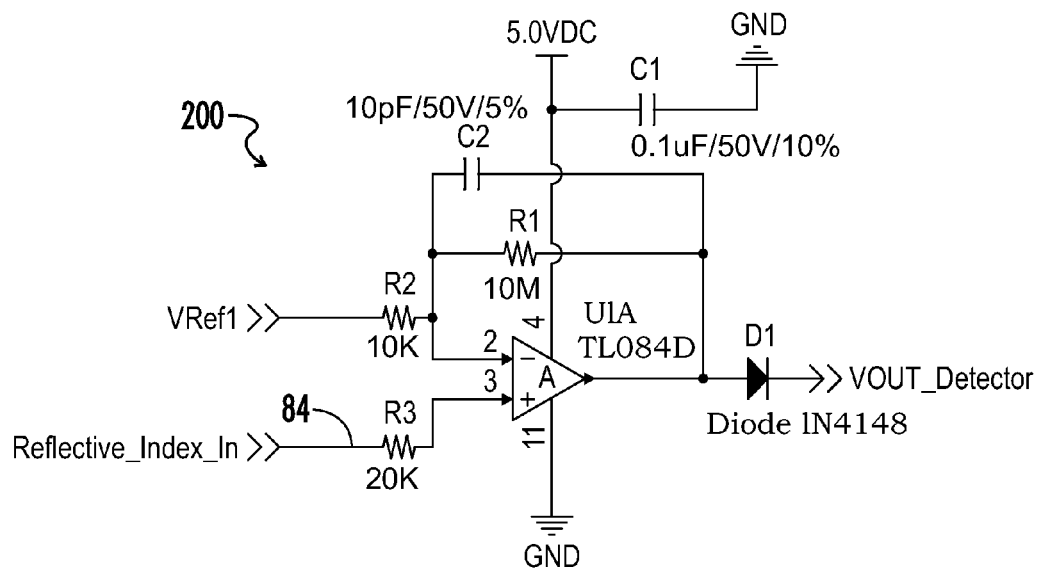
FIG. 12 illustrates a circuit diagram showing an embodiment of a voltage threshold detector circuit for processing a return energy signal in accordance with the present invention.

Return energy signal 84 may be processed to identify the location and magnitude of peak return energy signature using one or more circuits. In additional embodiments, the present invention provides a precision voltage threshold detector circuit 200, as seen in an exemplary embodiment in FIG. 12. Voltage threshold detector circuit 200 receives the analog voltage return energy signal 84 and compares it to a reference analog voltage input signal VREF1 which is an adjustable voltage reference from a precision voltage device. VREF1 provides a comparison voltage for threshold detection in some embodiments. VREF1 is determined by identifying a threshold voltage range for different signatures of reflected acoustic wave energy corresponding to different materials, such as those illustrated in FIG. 10 and FIG. 11. Voltage threshold detector circuit 200 may be an operational amplifier model IC TL084D manufactured by Texas Instruments of Dallas, Tex. in some embodiments. In some embodiments, the threshold detection circuit 200 may be part of signal conditioning circuit 64.

Figure 13:
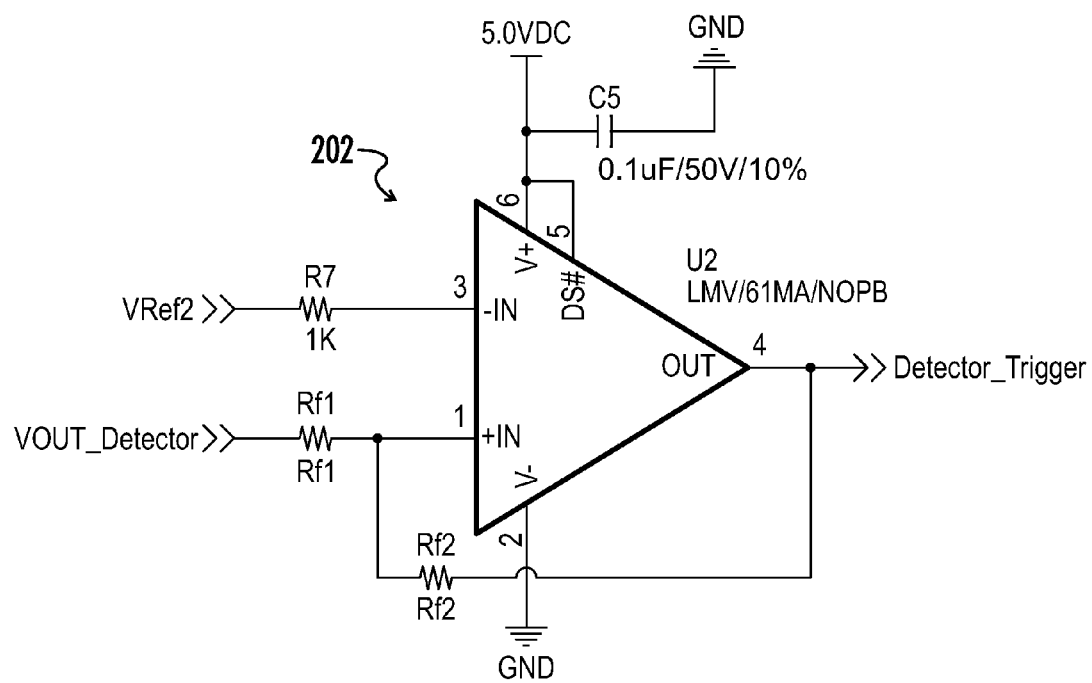
FIG. 13 illustrates a circuit diagram showing an embodiment of a peak detector circuit for processing voltage output of the voltage threshold detector circuit of FIG. 12.

If the return energy signal 84 voltage input to voltage threshold detector circuit 200 exceeds a predetermined VREF1 voltage, then an output voltage VOUT is passed to a peak detector circuit 202, seen in FIG. 13. Peak detector circuit 202 may use a comparator IC component, such as model LMV761 from National Semiconductor, to identify peak voltage levels in the return energy signal 84. The peak detector circuit 200 passes an analog voltage output to the input capture of a microcontroller 60. In some embodiments, the output voltage is a positive 5.0V analog signal which is received by the microcontroller input capture and flags the data sample associated with a rise in return energy signal voltage. By flagging the data sample through the input capture in microcontroller 60 using voltage threshold detector circuit 200 and peak detector circuit 202, microcontroller 60 can be routinely programmed to identify which width sample measurement corresponds to the change in acoustic impedance at the tire/rim interface. Once the peak voltage is triggered, the microcontroller may cease operation of the sonar module 30 and continue with control of other wheel balancing operations. In some embodiments, the peak detector circuit 202 may be part of signal conditioning circuit 64.

Figure 14:
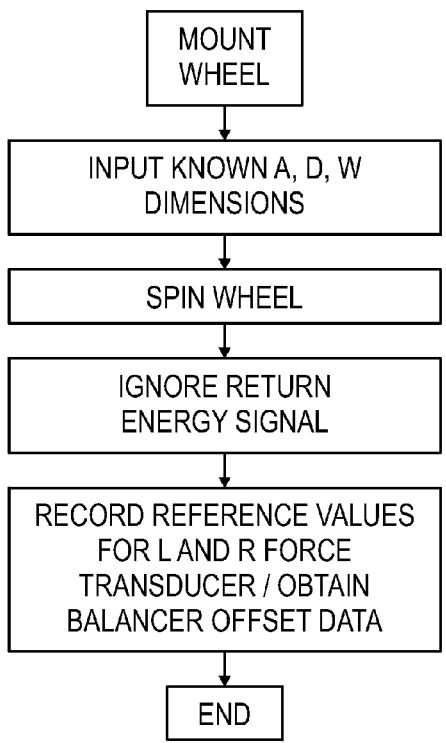
FIG. 14 illustrates a block diagram showing a series of steps for calibrating a wheel balancing machine in accordance with the present invention.

In some applications, use of an acoustic module apparatus for determining width dimension W at the proper location requires an initial calibration procedure. As seen in FIG. 14, an exemplary calibration procedure involves first mounting a balanced wheel of known diameter on the shaft. The known dimensional parameters A, D, and W are entered into the machine processor, which may be microprocessor 60. The wheel is spun. During the spin procedure, the return energy index input is ignored. The reference values for the L and R force transducers 32, 34 coupled to the shaft are identified and recorded and the balancer's offset data is attained. At this point the initial calibration may be ended.

Figure 15:
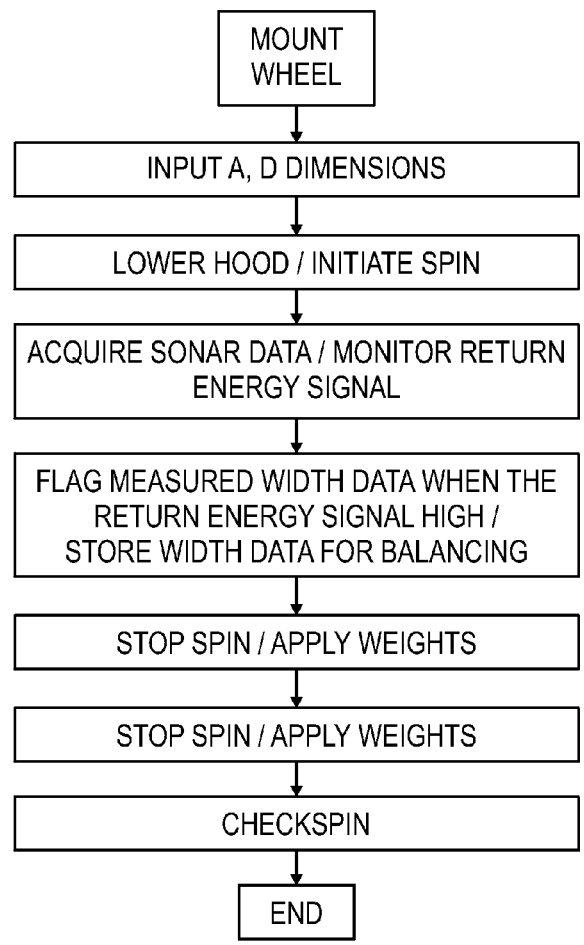
FIG. 15 illustrates a block diagram showing a series of steps for performing a wheel balancing operation on a wheel assembly in accordance with the present invention.

As seen in FIG. 15, a subsequent wheel balancing operation may be performed using the machine. When performing a balancing operation with an actual wheel, the parameters A and D are known and are input into the machine processor or computer. The hood is lowered and the wheel spin is initiated. The acoustic transducer scans the wheel assembly surface and collects distance data associated with numerous sample acquisition locations. The distance data is stored in a sample queue in a memory/data storage unit in the machine. During distance data acquisition, the return energy index signal is also monitored for variation in energy. When the acoustic beam passes the tire/rim transition, the return energy index signal increases, and the measured energy value is assigned to a corresponding distance value. The dimension data corresponding to the assigned energy value is used to calculate wheel assembly width dimension W. The calculated W value is stored in the machine memory/data storage unit for balancing operations. Wheel balancing calculations may be conventionally performed as described, for example, in U.S. Pat. No. 7,882,739, the disclosure of which is incorporated herein in its entirety. The wheel is then stopped, and corrective weights are applied at the indicated locations. A check-spin rotation may then be performed to verify the wheel is balanced and, if the wheel is balanced, the balancing process ends. If the check-spin rotation reveals the wheel is not balanced, the process may be repeated.

Figure 16:
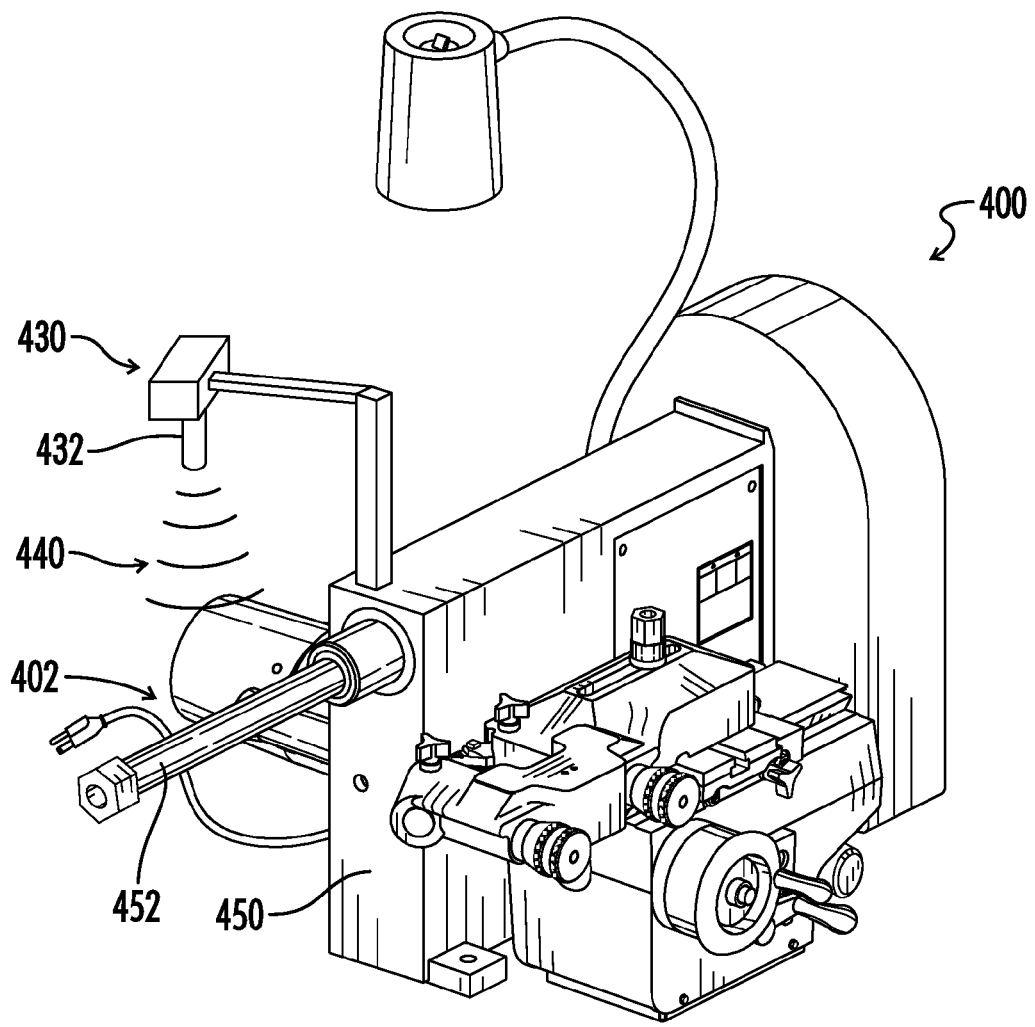
FIG. 16 illustrates an embodiment of a brake lathe apparatus including a sonar module configured to measure energy of a reflected acoustic wave in accordance with the present invention.
Figure 17:
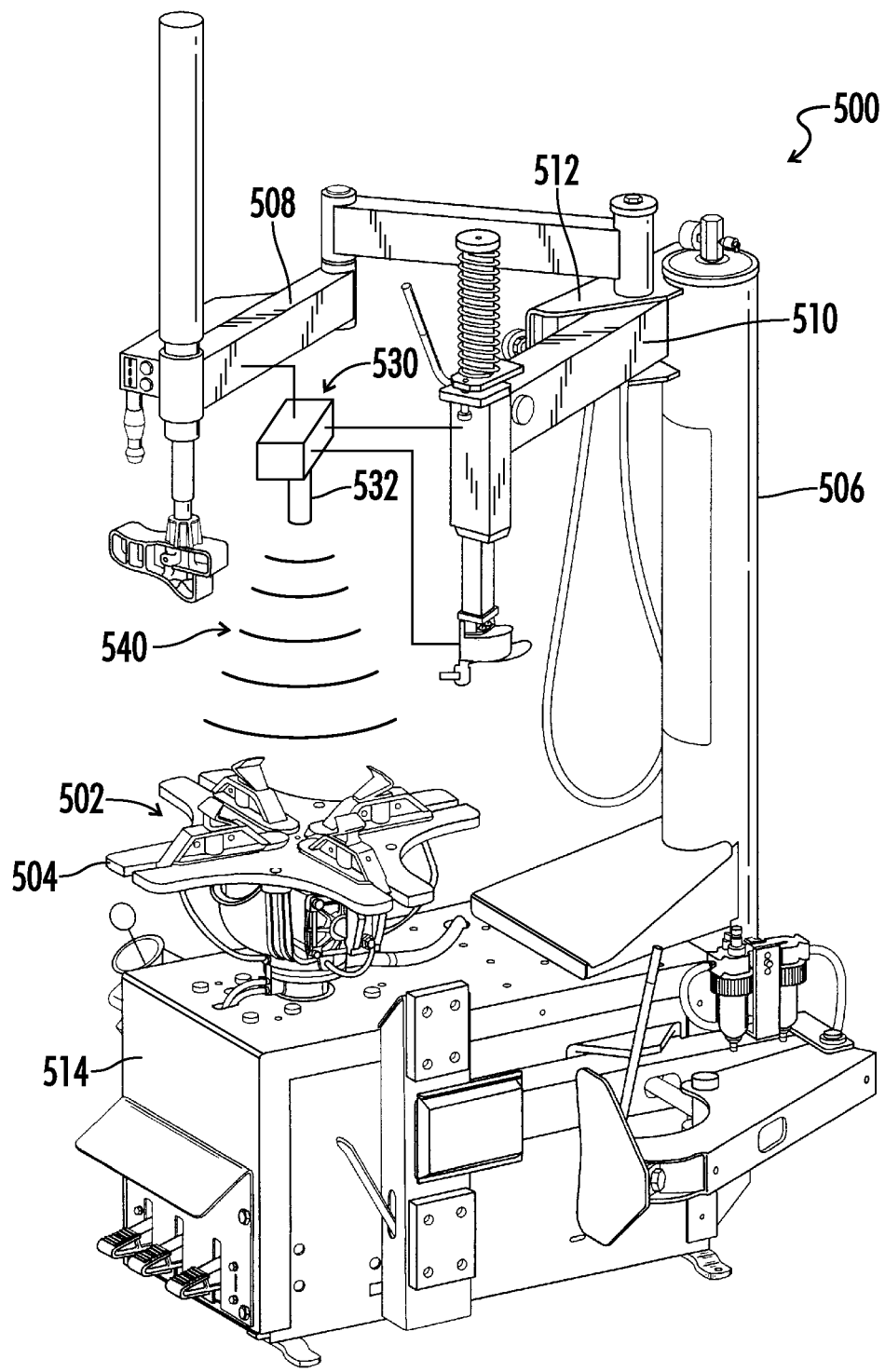
FIG. 17 illustrates an embodiment of a tire changing apparatus including a sonar module configured to measure energy of a reflected acoustic wave in accordance with the present invention.
Figure 18:
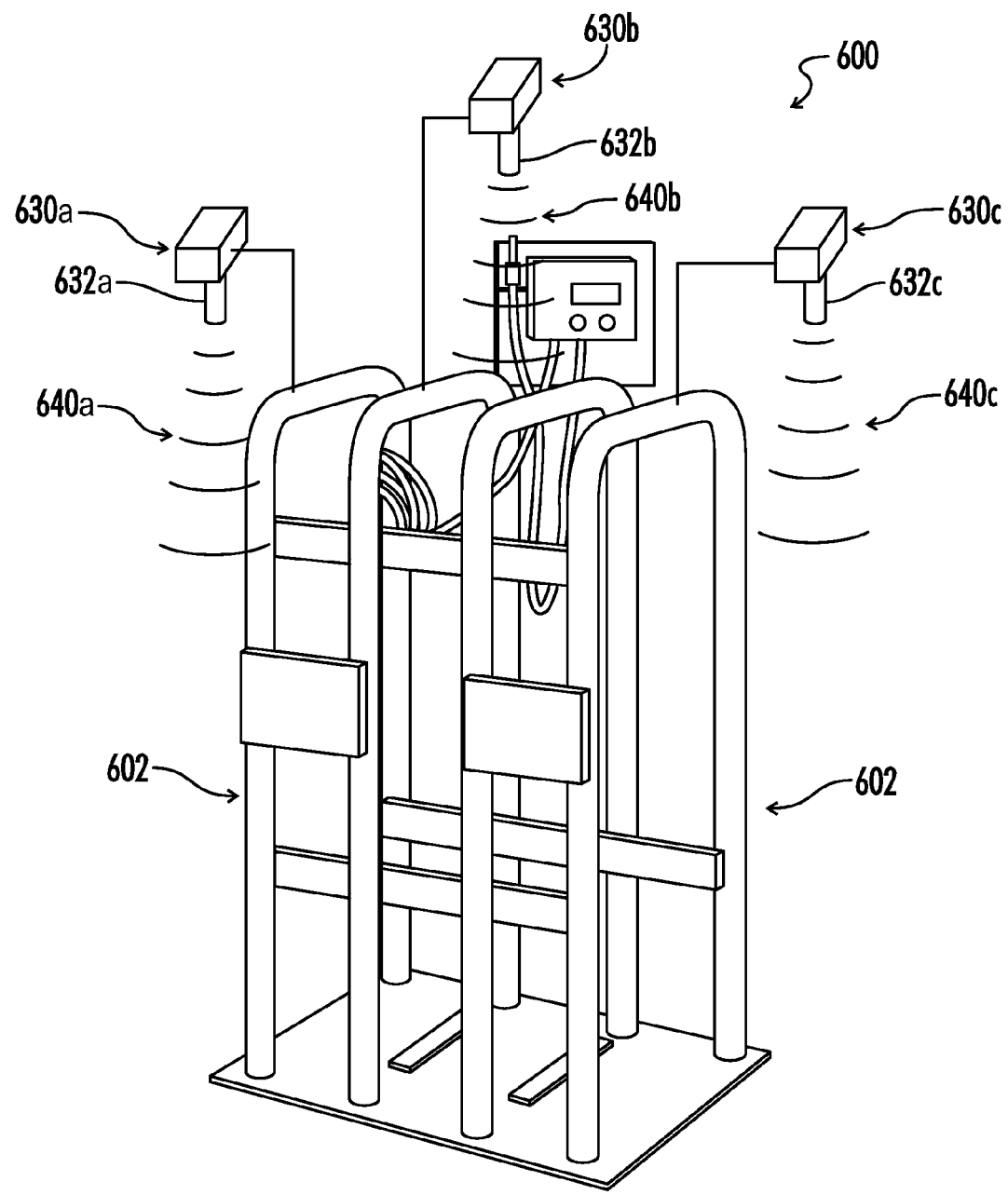
FIG. 18 illustrates an embodiment of a tire inflation system including a plurality of sonar modules configured to measure energy of reflected acoustic waves in accordance with the present invention.

Referring now to FIGS. 16-18, in some embodiments, the devices and methods of the present invention may be utilized to locate dissimilar material interfaces in other wheel servicing applications and to control or terminate operation of wheel servicing machinery.

As seen in FIG. 16, in some embodiments, a brake lathe 400 includes base 450, a rotatable brake lathe shaft 452 extending from the base, and a working region 402 for grinding or milling a brake component surface. During operation of brake lathe 400, it is undesirable for an operator's hand or any other item to enter working region 402. To prevent introduction of body parts or foreign items into working region 402 during use, many conventional brake lathes include one or more mechanical shields to block access to working region 402 during use. However, such mechanical shields are often cumbersome on the operator and can be expensive to produce, maintain, repair or install. The present invention provides a brake lathe including a sonar module 430 for monitoring working region 402. Sonar module 430 may be an acoustic transducer, and may be an ultrasonic transducer 432 in some embodiments. An acoustic beam can be emitted toward the working region 402. When a dissimilar material such as a human hand enters working region 402, a different return energy signal may be detected and the operation of brake lathe 400 can be slowed or terminated while the foreign object remains in the working region 402. Use of sonar module 430 as a safety feature may be used to supplement or replace the requirement for mechanical guards in some applications.

As seen in FIG. 17, in some additional embodiments, a tire changing machine 500 includes a base 514 and a support tower 506 extending upwardly from the base 514. A rotatable wheel holder 504 is disposed on the base 514. One or more tire changing tools extend toward a work area 502 near the wheel holder 504. During use, a wheel assembly is positioned on the wheel holder 504, and tire changing operations may be performed on the wheel assembly using one or more of the tire changing tools. During use, an operator's hands or other body parts may inadvertently enter the work area during a wheel servicing operation, potentially causing damage to the machine or serious injury to the user. The present invention provides a tire changing machine 500 including a sonar module 530 positioned above the wheel holder 504. An acoustic transducer 532 is included on sonar module 530. Acoustic transducer 532 may be an ultrasonic transducer in some embodiments. An acoustic beam 540 is emitted toward the work area 502 to detect the presence of different materials. If an operator's hand or another foreign object enters the work area, the transducer 532 may provide a return energy signal that can be used to control or terminate operation of the machinery.

In some particular applications, transducer 532 can monitor the work area during an inflation process. The apparatus is configured to monitor the return energy signal and reflectivity index during inflation to determine whether a human body part or other object enters the inflation blast zone. If such an event occurs, the apparatus may be configured to terminate the inflation process or reverse inflation and evacuate the air from the tire.

In various embodiments, sonar module 530 may be rigidly attached to support tower 506 or alternatively may be mounted on helper arm 508, swing arm 510, or support flange 512. In various embodiments, multiple sonar modules may be mounted on the various components to provide additional return energy signals for monitoring material interfaces and controlling machine operations during use.

Referring now to FIG. 18, in some embodiments, a tire inflation system 600 such as an inflation guard or inflation cage provides an inflation zone 602 for positioning a wheel assembly with a tire loosely mounted on a rim. The wheel assembly may be placed on the interior of the cage, and the tire may be rapidly inflated. The cage provides a debris barrier in case the tire fails during the inflation process. During use, an operator may inadvertently position a hand or body part in the inflation zone 602 during an inflation process, resulting in damage to the equipment or injury to the operator. In some embodiments, one or more sonar modules 630a, 630b, 630c, etc. may be positioned at various locations around inflation system 600. Each sonar module includes an acoustic transducer, such as an ultrasonic transducer 632a, 632b, 632c that emits a beam of ultrasonic energy 640a, 640b, 640c, respectively. Each sonar module may be configured to measure a return energy signal that is characteristic of a sonar reflectivity index. If a dissimilar material such as a body part is introduced into the inflation zone 602, the device will control or terminate the inflation procedure.

Thus, although there have been described particular embodiments of the present invention of a new and useful Sonar Method and Apparatus for Determining Material Interfaces in Wheel Servicing Equipment it is not intended that such references be construed as limitations upon the scope of this invention except as set forth in the following claims.

What is claimed is:

1. A wheel balancer apparatus, comprising:
a base;
a rotatable shaft extending away from the base;
an acoustic transducer module mounted at a location relative to the shaft, the acoustic transducer module comprising at least one acoustic transceiver configured to measure acoustic wave energy associated with acoustic waves reflected to the acoustic transceiver from a wheel assembly mounted on the shaft;
the acoustic transducer module is further configured to output a reflective energy index signal representative of reflected acoustic wave energy measured by the acoustic transceiver associated with acoustic waves that are reflected from the wheel assembly; and
a processor coupled to the acoustic transducer module, the processor configured to identify a tire and wheel interface in the wheel assembly using the reflective energy signal.

2. The apparatus of claim 1, wherein:
the reflective energy index signal comprises an analog voltage signal between about zero volts and about five volts.

3. The apparatus of claim 1, wherein:
the acoustic transducer module is further configured to output a pulse output signal representative of a time between acoustic waves that are reflected from the wheel assembly.

4. The apparatus of claim 3, further comprising:
the processor is further configured to provide an input voltage signal to the acoustic transducer module;
the acoustic transducer module further comprises at least one acoustic transducer configured to emit acoustic waves toward the wheel assembly in response to the input voltage signal;
the processor is further configured to receive both the pulse output signal and the reflective energy index signal; and
the processor is further configured to generate distance data by comparing the input voltage signal to the pulse output signal.

5. The apparatus of claim 4, wherein,
the processor is configured to identify changes in voltage peaks in the reflective energy index signal and to flag one or more distance data values corresponding to the changes in voltage peaks in the reflective energy index signal.

6. The apparatus of claim 5, further comprising:
the processor is configured to determine a wheel width dimension using the flagged distance data values.

7. The apparatus of claim 1, further comprising:
a hood pivotally attached to the base and shaped for covering a portion of the wheel assembly when the wheel assembly is mounted on the shaft; and
the acoustic transducer module is mounted on the hood.

8. The apparatus of claim 7, wherein:
the acoustic transducer module is moveable relative to the shaft.

9. The apparatus of claim 7, wherein:
the acoustic transducer module is moveable relative to the hood.

10. A method of balancing a wheel assembly, comprising:
(a) providing a wheel balancing machine including a rotatable shaft and an acoustic transducer positioned at a location relative to the shaft;
(b) positioning a wheel assembly having a tire mounted on a rim onto the shaft;
(c) acquiring distance data associated with the distance between the acoustic transducer and the wheel assembly at a plurality of sample acquisition locations; and
(d) acquiring energy data associated with reflected acoustic wave energy at each sample acquisition location; and
(e) detecting variation in the acquired energy data and correlating the variation to the acquired distance data.

11. The method of claim 10, further comprising:
calculating the wheel assembly width dimension using dimension data acquired at the sample acquisition location corresponding to the variation in the acquired energy data.

12. The method of claim 11, further comprising:
rotating the wheel; and
applying corrective weights to the wheel.

13. A method of determining a wheel width dimension of a wheel assembly, comprising:
(a) emitting acoustic waves toward the wheel assembly using an acoustic transducer;
(b) detecting acoustic waves reflected from the wheel assembly back toward the acoustic transducer;
(c) processing a plurality of distance values associated with the reflected acoustic waves;
(d) measuring the reflective energy of the reflected acoustic waves;
(e) processing a plurality of reflective energy values associated with the reflected acoustic waves;
(f) identifying a reflective energy value associated with a change in measured reflective energy; and
(g) matching the identified reflective energy value with a corresponding distance value.

14. The method of claim 13, further comprising:
selecting the corresponding distance value; and
calculating the wheel width dimension using the corresponding distance value.

15. The method of claim 13, wherein, the identified reflective energy value is associated with a positive change in measured reflective energy.

16. The method of claim 13, wherein the identified reflective energy value is associated with a negative change in measured reflective energy.

\* \* \* \* \*